(12) United States Patent
Moore et al.

(10) Patent No.: US 6,394,649 B1
(45) Date of Patent: May 28, 2002

(54) RADIATION ONCOLOGY PORTAL IMAGING ASSEMBLY AND METHOD OF PORTAL IMAGING

(75) Inventors: William E. Moore, Macedon; David J. Steklenski, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/651,761

(22) Filed: Aug. 30, 2000

(51) Int. Cl.[7] .............................................. G03B 42/02
(52) U.S. Cl. ....................................... 378/182; 378/185
(58) Field of Search ................................ 378/156, 182, 378/185

(56) References Cited

U.S. PATENT DOCUMENTS

| | | | |
|---|---|---|---|
| 5,070,248 A | * 12/1991 | Pesce | 250/483.1 |
| 5,376,801 A | * 12/1994 | Saotome et al. | 250/482.1 |
| 5,380,636 A | * 1/1995 | Malfatto et al. | 430/503 |
| 5,574,768 A | * 11/1996 | McLean | 378/185 |
| 5,734,693 A | * 3/1998 | Quint et al. | 378/185 |
| 5,871,892 A | 2/1999 | Dickerson et al. | 430/502 |

* cited by examiner

*Primary Examiner*—Robert H. Kim
*Assistant Examiner*—Allen C. Ho
(74) *Attorney, Agent, or Firm*—J. Lanny Tucker (57) ABSTRACT

Portal radiographic imaging can be carried out using any suitable imaging equipment because of a modification to the imaging assembly to give it more flexibility for various imaging conditions. The imaging assembly includes a radiographic film, and at least one fluorescent intensifying screen. Disposed between the film and screen is a filter that attenuates the light emitted from the intensifying screen during exposure of the film.

16 Claims, 2 Drawing Sheets

RADIATION ONCOLOGY PORTAL IMAGING ASSEMBLY AND METHOD OF PORTAL IMAGING

FIELD OF THE INVENTION

This invention relates to portal radiography using radiation therapy treatment beams. More particularly, it relates to an assembly useful for radiation oncology portal imaging system using radiographic films and intensifying screens, and to a method of using it.

BACKGROUND OF THE INVENTION

In conventional medical diagnostic imaging, the object is to obtain an image of a patient's internal anatomy with as little X-radiation exposure as possible. The fastest imaging speeds are realized by mounting a dual-coated radiographic element between a pair of fluorescent intensifying screens for imagewise exposure. About 5% or less of the exposing X-radiation passing through the patient is adsorbed directly by the latent image forming silver halide emulsion layers within the dual-coated radiographic element. Most of the X-radiation that participates in image formation is absorbed by phosphor particles within the fluorescent screens. This stimulates light emission that is more readily absorbed by the silver halide emulsion layers of the radiographic element.

Examples of radiographic element constructions for medical diagnostic purposes are shown in U.S. Pat. No. 4,425,425 (Abbott et al), U.S. Pat. No. 4,425,426 (Abbott et al), U.S. Pat. No. 4,414,310 (Dickerson), U.S. Pat. No. 4,803,150 (Kelly et al) and U.S. Pat. No. 4,900,652 (Kelly et al), U.S. Pat. No. 5,252,442 (Tsaur et al), and *Research Disclosure,* Vol. 184, August 1979, publication 18431.

Radiation oncology is the branch of radiology directed to radiation treatment of cancers. Much of the work is called teletherapy, that is the use of powerfill, high-energy X-ray machines (often linear accelerators) to irradiate the cancerous tissues. The goal of the treatment is to cure the patient by selectively irradiating the cancer with sufficiently high dosage to destroy it, yet minimizing the radiation impacting adjacent normal tissues.

Such treatments are commonly made using high energy X-rays (generally 4000 to 25,000 kVp). The X-ray beams are carefully mapped for intensity and energy. The patient is carefully imaged using a conventional diagnostic X-ray machine and/or a CT scanning machine and/or an MRI scanning machine to accurately locate features in the patient's anatomy. With this information, a dosimetrist determines where and for how long the treatment X-rays should be directed. The dosimetrist uses a computer to predict the radiation dose necessary for the patient's condition. This may lead to some normal tissues being too greatly exposed. The dosimetrist will then use one or more "blocks" or shields to block radiation from reaching the patient's normal tissues. These "blocks" are custom shaped for each patient and are typically made from thick pieces of lead.

Portal radiography is used to provide images to position and confirm radiotherapy in which the patient is given a dose of high energy X-radiation (from 4 to 25 MVp) through a "port" in a radiation shield. The object is to line up the port with a targeted tumor so it receives a cell-killing dose of X-radiation. In localization imaging the portal radiographic element is briefly exposed to the X-radiation passing through the patient with the shield removed and then with the shield in place. Exposure without the shield provides a faint image of anatomical features that can be used as orientation references near the target (e.g., tumor) area while the exposure with the shield superimposes a second image of the port area. The exposed localization radiographic element is quickly processed to produce a viewable image and confirm that the port is in fact properly aligned with the intended anatomical target. During the above procedure patient exposure to high energy X-radiation is kept to a minimum. The patient typically receives less than 20 RADs during this procedure.

Thereafter, before the patient is allowed to move, a cell-killing dose of X-radiation is administered through the port. The patient typically receives from 50 to 300 RADs during this step. Since any movement of the patient between the localization exposure and the treatment exposure can defeat the entire alignment procedure, the importance of minimizing the time elapsed during the element processing cycle is apparent. Reducing this time by even a few seconds is highly beneficial.

A second, less common form of portal radiography is the verification of the location of the cell killing exposure. Again, the object is to record enough anatomical information to confirm that the cell killing exposure was properly aligned with the targeted anatomy.

It is appreciated that the large differences in exposure times that distinguish localization and verification imaging have up to the date of this invention precluded the successful use of a single portal radiographic element to serve both applications.

Both localization and verification portal imaging have suffered from very poor image quality. Anatomical features are often faint, barely detectable or even non-detectable. This has severely restricted reliance on portal radiography.

Although excellent radiographic imaging capabilities have been realized in medical diagnostic imaging, there are fundamental differences in the imaging physics that distinguish and render nonanalogous diagnostic and portal radiographic imaging. In diagnostic imaging X-radiation photon energy of up to 140 kVp is in part absorbed within the patient and in part passed through to be absorbed in a fluorescent intensifying screen to generate light that exposes the radiographic element.

In portal imaging the multi-MVp X-radiation in part passes through the patient unabsorbed and is in part absorbed creating a secondary electron emission. A front metal intensifying screen is relied upon to intercept and absorb the secondary electron emission. This lowers minimum density and significantly enhances image sharpness. Image intensification (raising maximum density and contrast) is achieved by absorbing X-radiation and transmitting to the radiographic element electrons that are thereby generated. The much higher capability of the radiographic element to absorb electrons as compared to X-radiation produces image intensification. Besides supplying electrons that are relied upon to expose the radiographic element, the front intensifying screen further contributes to image sharpness by transmitting to a much lesser extent electrons generated by obliquely oriented (that is scattered) X-radiation that it receives.

In addition to the front metal intensifying screen, which is always present, a back metal intensifying screen can be employed to provide an additional source of electrons for radiographic element exposure.

Figure 1:
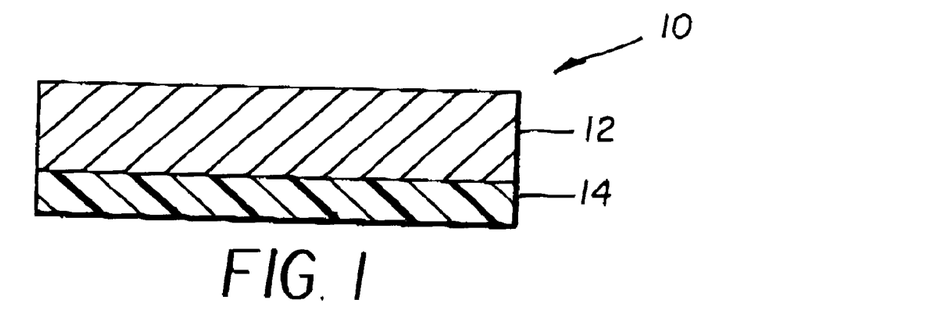
FIG. 1 is an enlarged cross sectional view of a conventional portal imaging assembly for direct exposure.

Portal imaging assemblies can be grouped into two categories. In the first category, the assembly includes one or two metal plates and a photographic silver halide film that is designed for direct exposure to X-rays or electrons. Two such films are commercially available from Eastman Kodak Company as KODAK X-RAY Therapy Localization (XTL) Film and KODAK X-RAY Verification (XV) Film. Such direct X-ray exposure assemblies are illustrated in FIG. 1 (described in more detail below). The advantage of such assemblies is that their contrast is very low so that a wide range of exposure conditions provides useful images. However, due to the high-energy radiation used to produce portal images, the subject contrast is also very low. Coupled with the low contrast of the image receptor system, the final image contrast is low and the images are difficult to read with needed accuracy.

Figure 2:
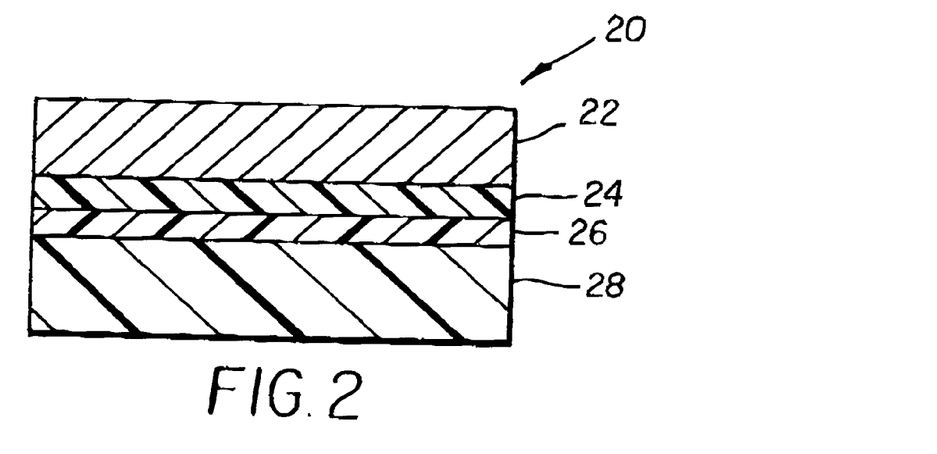
FIG. 2 is an enlarged cross sectional view of a conventional portal imaging assembly using fluorescent intensifying screens (indirect exposure).

The second portal imaging assembly uses a radiographic photographic silver halide film containing fine grain silver halide emulsions, one or two fluorescent (or phosphor) screens (or intensifying panels) and one or two metal plates. One such assembly is illustrated in FIG. 2 (described in more detail below). Although the assembly in FIG. 2 shows only one metal plate, other assemblies can have both front and back metal plates. Because a significant portion of the film's exposure comes from the light emitted by the fluorescent screens, it is possible to use high contrast films. These assemblies produce significantly higher contrast than direct exposure assemblies while the speed of both assemblies is similar. The resulting images have much higher Noise Equivalent Quanta ("NEQ"), show clearer definition of imaged features and are much easier to "read" than direct exposure images.

Due to the high contrast of both of these types of assemblies and variations in treatment dose, patient anatomy and tissue composition, equipment and other treatment variables, it is difficult to obtain a correct exposure of each patient. The resulting images are either too light or too dark. Exposure is often controlled by adjusting the "air gap" distance between the patient and the imaging system. Unfortunately, many therapy machines do not allow for an adjustable "air gap" and thus exposure adjustment is limited. This is especially true for verification imaging systems.

Useful portal imaging films and assemblies are described in U.S. Pat. No. 5,871,892 (Dickerson et al).

There is a need for a portal verification imaging assembly and system that can be used on any therapy machine and with which exposure can be suitably adjusted as needed.

SUMMARY OF THE INVENTION

This invention provides an assembly for radiation portal imaging comprising in association:

a) a radiographic film comprising a support and a radiation-sensitive layer disposed thereon, b) an fluorescent intensifying screen, and c) disposed between the radiographic film and the fluorescent intensifying screen, a filter that has a density of at least 0.05 and attenuates the light emitted from the intensifying screen during exposure of the radiographic film, the filter being disposed on the radiation-sensitive layer of the radiographic film.

This invention also provides a light-tight imaging article comprising a light-tight container that contains the assembly described above.

Further, the present invention provides a method of portal imaging comprising:

A) positioning a patient between a source of imaging radiation and the light-tight imaging article described above, and B) exposing the imaging article to imaging radiation of from about 4,000 to about 25,000 keV after the radiation passes through the patient.

The radiation portal imaging assembly of the present invention can be used in portal imaging in any suitable therapy machine because it includes one or more filters that attenuates or controls the light emitted from the intensifying screen during exposure to reach the radiographic film. With modest experimentation, it can be readily determined what filter may be useful for a given patient and therapy machine. Thus, the assembly can be easily used to correct for density errors due to patient dose, invariant air gaps, different exposure energies or any combination of these parameters. The assembly is also useful with any portal imaging systems using one or two intensifying screens, with or without accompanying metal screens.

DETAILED DESCRIPTION OF THE INVENTION

Definition of Terms

The term "RAD" is used to indicate a unit dose of absorbed radiation, that is energy absorption of 100 ergs per gram of tissue.

The term "portal" is used to indicate radiographic imaging, films and intensifying screens applied to megavoltage radiotherapy conducted through an opening or port in a radiation shield.

The term "localization" refers to portal imaging that is used to locate the port in relation to the surrounding anatomy of the patient. Typically exposure times range from 1 to 10 seconds.

The term "verification" refers to portal imaging that is used to record patient exposure through the port during radiotherapy. Typically exposure times range from 30 to 300 seconds.

The term "contrast" as herein employed indicates the average contrast (also referred to as "g") derived from a characteristic curve of a portal radiographic element using as a first reference point (1) a density ($D_1$) of 0.25 above minimum density and as a second reference point (2) a density ($D_2$) of 2.0 above minimum density, where contrast is DD (that is 1.75), $D\log_{10}E$ ($\log_{10}E_2 - \log_{10}E_1$), $E_1$ and $E_2$ being the exposure levels at the reference points (1) and (2).

The term "dual-coated" is employed to indicate radiographic elements having image forming units on opposite sides of a support.

The term "crossover" as herein employed refers to the percentage of light emitted by a fluorescent intensifying screen that strikes a dual-coated radiographic film and passes through its support to reach the image forming layer unit coated on the opposite side of the support.

The terms "kVp" and "MVp" stand for peak voltage applied to an X-ray tube times $10^5$ and $10^6$, respectively.

The term "fluorescent intensifying screen" refers to a screen that absorbs X-radiation and emits light.

The term "metal intensifying screen" refers to a metal screen that absorbs MVp level X-radiation to release electrons and absorbs electrons that have been generated by X-radiation prior to reaching the screen.

The terms "front" and "back" refer to features or elements nearer to and farther from, respectively, the X-radiation source than the support of the radiographic element.

The term "fully forehardened" is employed to indicate the forehardening of hydrophilic colloid layers to a level that limits the weight gain of a portal radiographic element to less than 120 percent of its original (dry) weight in the course of processing. The weight gain is almost entirely attributable to the ingestion of water during processing.

The term "rapid access processing" is employed to indicate dry-to-dry processing of a radiographic element in 45 seconds or less. That is, 45 seconds or less elapse from the time a dry imagewise exposed radiographic element enters a processor until it emerges as a dry fully processed element.

All references to silver halide grains and emulsions containing two or more halides refer to the halides in order of ascending concentrations.

The "aspect ratio" of a grain is the ratio of its equivalent circular diameter (ECD) to its thickness. The ECD of a grain is the diameter of a circle having an area equal to the projected area of the grain.

The "coefficient of variation" (COV) of grain size (ECD) is defined as 100 times the standard deviation of grain size divided by mean grain size.

The term "covering power" is used to indicate 100 times maximum density divided by silver coating coverage measured in $g/dm^2$.

The term "rare earth" is used to indicate elements having an atomic number of 39 or 57 through 71.

*Research Disclosure* is published by Kenneth Mason Publications, Ltd., Dudley House, 12 North St., Emsworth, Hampshire P010 7DQ, England.

The present invention can be described in part by reference to the Figures.

FIG. 1 illustrates a conventional direct portal imaging receptor 10 comprising metal sheet or plate (metal intensifying screen) 12 and radiographic film 14. Radiographic film 14 can be any suitable silver halide photographic film designed for photographic imaging as described hereinbelow. Examples of such films include KODAK X-Ray Therapy Localization (XTL) Film and KODAK X-ray Therapy Verification (XV) Film.

In FIG. 2, a conventional indirect portal imaging receptor 20 comprises metal intensifying screen 22, front fluorescent intensifying screen 24, radiographic film 26 and back fluorescent intensifying screen 28. Metal intensifying screen 22 can be composed of any suitable metal as described below, and radiographic film 26 can be any suitable film as described herein (for example, KODAK EC Radiographic Film). The front and back fluorescent intensifying screens 24 and 28 can be any useful fluorescent intensifying screen that would be readily apparent to one skilled in the art, as described in more detail below.

The advantages of the present invention are achieved by using certain filters in the radiation portal imaging assembly. These filters can for example be prepared from transparent polymeric films (such as polyester films) and a very fine grain, low contrast silver halide emulsion (described below). They are filters having a density of at least 0.05 that absorb some of the light from one or more intensifying screens before it reaches the radiographic films, thereby reducing the speed of the assembly in a controlled fashion. The preferred filters are neutral density filters, but colored filters can also be used as shown in Example below.

For purposes of demonstrating this invention in the Examples below, we prepared a set of such filters consisting of one-step tablet of nine different densities of about 0.10, 0.14, 0.17, 0.21, 0.26, 0.30, 0.35, 0.40 and 0.45, and nine full sheets of the same densities as in the step tablet.

Figure 3:
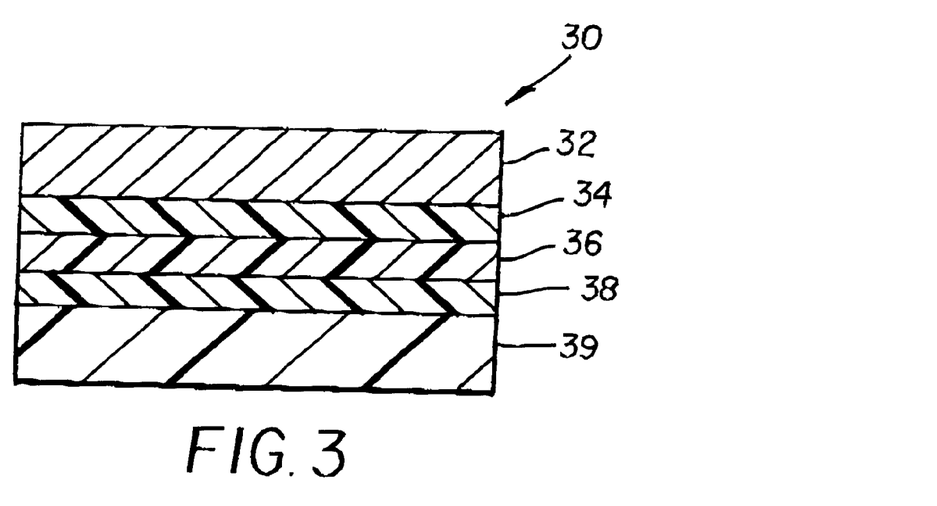
FIG. 3 is an enlarged cross sectional view of a portal imaging assembly comprising both front and back fluorescent intensifying screens and a step tablet between the radiographic film and the back fluorescent intensifying screen.

In practice, these filters can be used in the following manner. We started with an imaging assembly that is faster than needed to obtain a useful image. Between the radiographic film and a back intensifying screen, we inserted the step tablet between the radiographic film (for example KODAK EC Radiographic Film) and the back fluorescent intensifying screen. This arrangement is shown in FIG. 3 wherein imaging assembly 30 comprises metal intensifying screen 32, front fluorescent intensifying screen 34, radiographic film 36, step tablet (or filter) 38 and back fluorescent intensifying screen 39. Step tablet 38 is disposed with its silver halide emulsion side towards back fluorescent intensifying screen 39.

Figure 4:
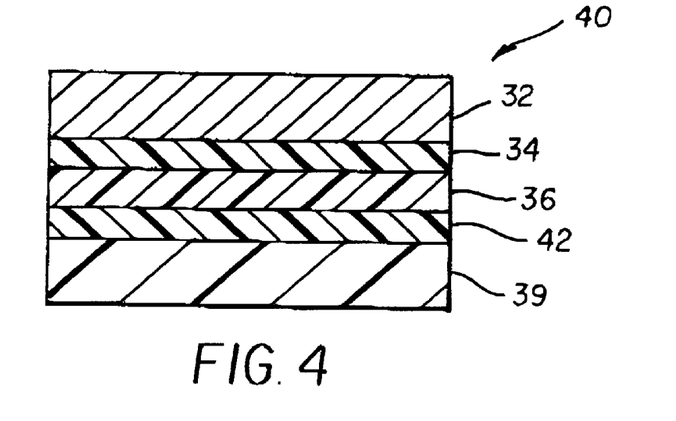
FIG. 4 is an enlarged cross sectional view of a portal imaging assembly of the present invention comprising both front and back fluorescent intensifying screens and a single attenuating filter between the radiographic film and the back fluorescent intensifying screen.

We tested the assembly of FIG. 3 by placing it and a tissue equivalent phantom in a conventional therapy machine (for example, a Varian 6/12 MVp therapy machine), and made an exposure under standard conditions for portal imaging. The radiographic film was processed using conventional radiographic processing solutions (black-and-white developing and fixing compositions described below) to provide an image. We noted if one of the "steps" on the step tablet provided an acceptable density. If so, we removed the step tablet from the assembly and replaced it with a full size filter having that density. This embodiment of the invention is illustrated in FIG. 4 wherein imaging assembly 40 was similar to that shown in FIG. 3 except that step tablet 38 has been replaced with filter 42 whose emulsion side was faced toward back fluorescent intensifying screen 39.

We reloaded the imaging assembly with unexposed radiographic film and repeated the exposure and film processing to provide a desired portal image.

Figure 5:
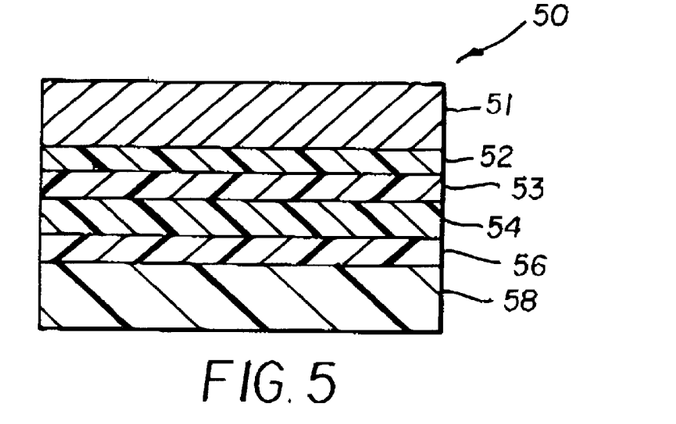
FIG. 5 is an enlarged cross sectional view of a portal imaging assembly comprising both front and back fluorescent intensifying screens and an attenuating filter on the back side of the radiographic film and a step tablet on its front side.

In another embodiment, if the step table shown in FIG. 3 did not provide any good image, we replaced it with a filter having the 0.45 density and put the step table between the front fluorescent intensifying screen and the radiographic film. This arrangement is shown in FIG. 5. Thus, imaging assembly 50 comprises metal intensifying screen 51, front fluorescent intensifying screen 52, step tablet 53, radiographic film 54, 0.45 density filter 56 and back fluorescent intensifying screen 58. The silver halide emulsion of step tablet 53 was directed towards front fluorescent intensifying screen 52 and the silver halide emulsion of the 0.45 density filter 56 was disposed towards back fluorescent intensifying screen 58.

The imaging assembly of FIG. 5 was exposed as described above and the radiographic film was processed under conventional conditions to provide a lower density image. One of the steps in the step tablet showed good density. The step table was then removed from the imaging assembly and replaced with a filter having the desired density.

Figure 6:
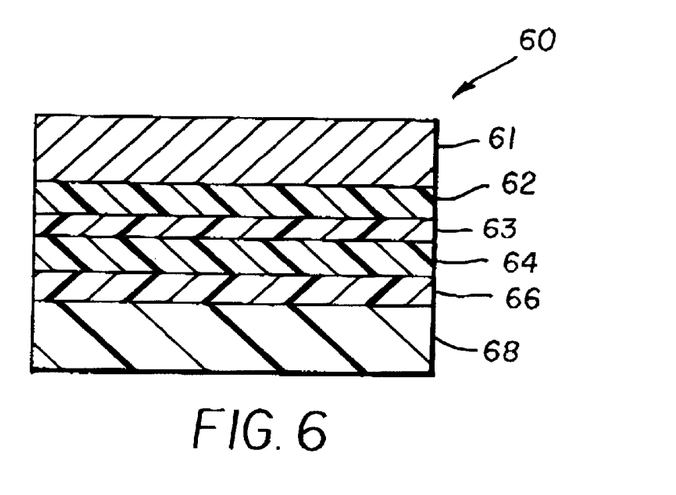
FIG. 6 is an enlarged cross sectional view of a portal imaging assembly of the present invention comprising both front and back fluorescent intensifying screens and an attenuating filter on both the front and back sides of the radiographic film.

This arrangement is shown in FIG. 6, wherein imaging assembly 60 comprises metal intensifying screen 61, front fluorescent intensifying screen 62, filter 63, radiographic film 64, the 0.45 density filter 66 and back fluorescent intensifying screen 68. The silver halide emulsion of filter 63 was directed towards front fluorescent intensifying screen 62 and the silver halide emulsion of the 0.45 density filter 66 was disposed towards back fluorescent intensifying screen 68.

The protocol just described should be useful to provide acceptable clinical images of patients using any suitable portal imaging equipment without additional modifications. If, however, the initial patient images are not optimal in quality, it may be necessary to adjust image density by changing the filters slightly (for example, using a different filter density). These changes should be routine in nature since changing the filters in one-step intervals would be the simplest way to determine the optimum filter density for a given imaging situation.

During localization portal imaging the patient is briefly exposed to 4 to 25 MVp X-radiation over an area somewhat larger than the radiotherapy target area for the purpose of obtaining a discernible image of anatomy reference features outside the target area. This is immediately followed by a brief exposure through the port in the shields, to create an image of the port superimposed on the broader area first exposure. Total exposure during localization imaging is limited to 10 seconds or less, typically from 1 to 10 seconds. The object is to obtain an image that confirms or guides alignment of the port for radiotherapy, but to limit exposure to the MVp X-radiation to the extent possible. By seeing in the image the location of the port in relation to reference anatomy features, the port can be more accurately aligned with the target area, if necessary, before the longer duration radiotherapy exposure begins.

If present, the metal intensifying screens each absorb MVp X-radiation and emit electrons. The portal radiographic element itself absorbs only a very small fraction of the MVp X-radiation and the emitted electrons. The primary exposure of the portal radiographic element is provided by light emitted by the fluorescent layer of the fluorescent intensifying screens. The fluorescent layer much more efficiently than the radiographic element captures emitted electrons, resulting in light emission. The light emitted by the fluorescent intensifying screen is efficiently captured by the portal radiographic element.

The thus loaded cassette is then capable of providing a verification image of the actual radiotherapy exposure. During the radiotherapy exposure 4 to 25 MVp X-radiation exposures of at least 30 seconds, typically 30 to 300 seconds are employed.

Although preferred portal imaging assemblies have been described above, it is appreciated that varied imaging assemblies are possible.

The exact choice of screens to be used during the localization and verification imaging steps can be varied, depending upon the output of the screens and the sensitivity of the portal radiographic element used in both exposures. Where the portal radiographic element is of somewhat lower speed or the MVp exposure during localization portal imaging tends toward minimal levels, it is specifically contemplated to insert a second fluorescent intensifying screen between a front metal intensifying screen and the portal radiographic element. In a specifically preferred localization imaging assembly, a back metal intensifying screen is omitted, and a second fluorescent intensifying screen is interposed between the portal radiographic element and the front metal intensifying screen. In another localization imaging assembly, two metal intensifying screens are employed in combination with the two fluorescent intensifying screens.

To allow a single cassette construction to be employed with varied imaging assemblies, differing in functioning elements, it is conventional practice to include within the cassette a compressible foam sheet. A plastic sheet can be used, if desired, to distribute the compressive force applied by the compressible foam sheet. This allows each assembly to be similarly compressed when the cassette is closed for exposure.

The portal radiographic elements useful in the practice of this invention have constructions that are well within the capabilities of those skilled in the art. The elements can be what is known in the art as conventional "wet" chemistry processed materials.

Any conventional transparent radiographic or photographic film support can be employed in constructing the radiographic elements. It is preferred to employ a radiographic film support, since this maximizes compatibility with the rapid access radiographic film processors in which the films are intended to be processed and provides a radiographic film look and feel to the processed film. Radiographic film supports usually exhibit these specific features: (1) a film support that is constructed of polyesters to maximize dimensional integrity rather than employing cellulose acetate supports as are most commonly employed in photographic elements and (2) that is blue tinted to contribute the cold (blue-black) image tone sought in the fully processed films, whereas photographic films rarely, if ever, employ blue tinted supports. Radiographic film supports, including the incorporated blue dyes that contribute to cold image tones, are described in *Research Disclosure*, Item 18431, cited above, Section XII. Film Supports. *Research Disclosure*, Vol. 365, September 1994, Item 36544, Section XV. Supports, illustrates in paragraph (2) suitable subbing layers to facilitate adhesion of hydrophilic colloids to the support. Although the types of transparent films set out in Section XV, paragraphs (4), (7) and (9) are contemplated, due to their superior dimensional stability, the transparent films preferred are polyester films, illustrated in Section XV, paragraph (8). Poly(ethylene terephthalate) and poly (ethylene naphthalene) are specifically preferred polyester film supports.

In addition to the support the portal radiographic elements contain one or more hydrophilic colloid layers coated on each side of the support forming front and back imaging units. In the simplest possible construction each imaging unit consists of a single radiation-sensitive layer such as a single silver halide emulsion layer. In more typical constructions, at least one emulsion layer is coated on each side of the support and the emulsion layer is overcoated with an interlayer and a surface protective overcoat. A preferred portal radiographic element layer construction is shown as PRE-1 below:

(PRE-I)

SURFACE PROTECTIVE OVERCOAT
INTERLAYER
EMULSION LAYER
SUBBING LAYER
TRANSPARENT FILM
SUBBING LAYER
EMULSION LAYER

-continued

| (PRE-I) |
| --- |
| INTERLAYER |
| SURFACE PROTECTIVE OVERCOAT |

The subbing layers and transparent film together form the support, discussed above.

The emulsion layers contain the light-sensitive silver halide relied upon for image formation. To facilitate rapid access processing the grains contain less than 3 mole percent iodide, based on total silver. The silver halide grains can take any of the following compositions: silver chloride, silver bromide, silver iodochloride, silver iodobromide, silver chlorobromide, silver bromochloride, silver iodochlorobromide, silver iodobromochloride, silver chloroiodobromide and silver iodochlorobromide. Small amounts of iodide are commonly incorporated into silver halide grains to increase their sensitivity, but in the preferred portal radiographic elements of the invention the grains are substantially free of iodide, since iodide is known to slow processing and to contribute to relatively warm image tones.

In a particularly preferred form the grains contain at least 50 mole percent chloride, based on total silver. Silver chloride exhibits the highest attainable rates of processing and is therefore specifically contemplated. It has been discovered that relatively high processing rates can be retained while increasing covering power and shifting to more desirable colder image tones by incorporating bromide as well as chloride in the grains. In an optimum balance of developability, covering power and image tone, the grains contain from 20 to 40 mole percent bromide, based on total silver. Thus silver chlorobromide emulsions are specifically preferred.

In addition to the advantages obtained by composition selection described above it is specifically contemplated to select the grains for their ability to impart contrasts in the range of from 4 to 8 to the portal radiographic elements. To achieve contrasts in this range it is contemplated to employ grains that exhibit a coefficient of variation (COV) of grain ECD of less than 20% and preferably, less than 10%. It is preferred to employ a grain population that is as highly monodisperse as can be conveniently realized. Since monodispersity as well as development rates generally decline with increasing grain sizes, it is specifically contemplated to limit mean grain sizes to less than 0.5 $\mu$m. Grains in the mean ECD range of from 0.1 to 0.4 $\mu$m offer an optimum balance of monodispersity and speed. Generally regular (e.g. cubic or octahedral) can be obtained at higher levels of monodispersity (lower COV's) than irregular (for example tabular) grains in the same mean ECD ranges. Non-tabular grains, those having an average aspect ratio of less than 2, are specifically preferred. Optimally the nontabular grains have an average aspect ratio of less than 1.3. (Notice that a cube has an aspect ratio, as herein defined, that is slightly greater than 1.0.)

In addition to controlling grain size dispersity, the contrast of the portal radiographic elements can be raised by the incorporation of one or more contrast enhancing dopants. Rhodium, cadmium, lead and bismuth are all well known to increase contrast by restraining toe development. The toxicity of cadmium has precluded its continued use. Rhodium is most commonly employed to increase contrast and is specifically preferred. Contrast enhancing concentrations are known to range from as low $10^{-9}$ mole/Ag mole. Rhodium concentrations up to $5\times10^{-3}$ mole/Ag mole are specifically contemplated. A specifically preferred rhodium doping level is from $1\times10^{-6}$ to $1\times10^{-4}$ mole/Ag mole.

A variety of other dopants are known, individually and in combination, to improve not only contrast but other common properties' as well, such as speed and reciprocity characteristics. Dopants capable providing shallow electron trapping sites, commonly referred to as SET dopants, are specifically contemplated. SET dopants are described in *Research Disclosure,* Vol. 367, November 1994, Item 36736. Iridium dopants are very commonly employed to decrease reciprocity failure. The extended exposure times of the portal radiographic elements render it highly desirable to include one or more dopants to guard against low intensity reciprocity failure, commonly referred to as LIRF. U.S. Pat. No. 4,997,751 (Kim), here incorporated by reference, provides a specific illustration of Ir doping to reduce LIRF. A summary of conventional dopants to improve speed, reciprocity and other imaging characteristics is provided by *Research Disclosure,* Item 36544, cited above, Section I. Emulsion grains and their preparation, sub-section D. Grain modifying conditions and adjustments, paragraphs (3), (4) and (5).

Low COV emulsions can be selected from among those prepared by conventional batch double-jet precipitation techniques. The emulsions can be prepared, for example, by incorporating a rhodium dopant during the precipitation of monodisperse emulsions of the type commonly employed in photographic reflection print elements. Specific examples of these emulsions are provided by U.S. Pat. No. 4,865,962 (Hasebe et al), U.S. Pat. No. 5,252,454 (Suzumuto et al), and U.S. Pat. No. 10 5,252,456 (Oshima et al), the disclosures of which are here incorporated by reference. A general summary of silver halide emulsions and their preparation is provided by *Research Disclosure,* Item 36544, cited above, I. Emulsion grains and their preparation.

After precipitation and before chemical sensitization the emulsions can be washed by any convenient conventional technique. Conventional washing techniques are disclosed by *Research Disclosure,* Item 36544, cited above, Section III. Emulsion washing.

The emulsions can be chemically sensitized by any convenient conventional technique. Such techniques are illustrated by *Research Disclosure*, Item 36544, IV. Chemical sensitization. Sulfur and gold sensitizations are specifically contemplated.

Both silver bromide and silver iodide have significant native sensitivity within the blue portion of the visible spectrum. Hence, when the emulsion grains contain high (>50 mol %, based on Ag) bromide concentrations, spectral sensitization of the grains is not essential, though still preferred. High chloride grains, particularly the specifically preferred silver bromochloride grains, possess little native sensitivity beyond the ultraviolet region of the spectrum, and are also preferably spectrally sensitized. It is specifically contemplated that one or more spectral sensitizing dyes will be absorbed to the surfaces of the grains to impart or increase their light-sensitivity. Ideally the maximum absorption of the spectral sensitizing dye is matched (for example within±10 nm) to the principal emission band or bands of the fluorescent intensifying screen. In practice any spectral sensitizing dye can be employed which, as coated, exhibits a half peak absorption bandwidth that overlaps the principal spectral region(s) of emission by the fluorescent intensifying screen intended to be used with the portal radiographic element.

A wide variety of conventional spectral sensitizing dyes are known having absorption maxima extending throughout the near ultraviolet (300 to 400 nm), visible (400 to 700 nm) and near infrared (700 to 1000 nm) regions of the spectrum. Specific illustrations of conventional spectral sensitizing dyes is provided by *Research Disclosure,* Item 18431, Section X. Spectral Sensitization, and Item 36544, Section V. Spectral sensitization and desensitization, A. Sensitizing dyes.

Instability which increases minimum density in negative-type emulsion coatings (that is fog) can be protected against by incorporation of stabilizers, antifoggants, antikinking agents, latent-image stabilizers and similar addenda in the emulsion and contiguous layers prior to coating. Such addenda are illustrated by *Research Disclosure,* Item 36544, Section VII. Antifoggants and stabilizers, and Item 18431, Section II. Emulsion Stabilizers, Antifoggants and Antikinking Agents.

The silver halide emulsion and other layers forming the processing solution permeable imaging units on opposite sides of the support contain conventional hydrophilic colloid vehicles (peptizers and binders), typically gelatin or a gelatin derivative. Conventional vehicles and related layer features are disclosed in *Research Disclosure,* Item 36544, II. Vehicles, vehicle extenders, vehicle-like addenda and vehicle related addenda. The emulsions themselves can contain peptizers of the type set out in II above, paragraph A. Gelatin and hydrophilic colloid peptizers. The hydrophilic colloid peptizers are also useful as binders and hence are commonly present in much higher concentrations than required to perform the peptizing function alone. The vehicle extends also to materials that are not themselves useful as peptizers. Such materials are described in II above, C. Other vehicle components.

The films useful in the invention are fully forehardened to facilitate rapid access processing. The use of any convenient conventional hardener is contemplated. Such hardeners are described in II above, B. Hardeners.

By fully forehardening the hydrophilic colloids forming the imaging units and limiting the coating coverage the ingestion of water during processing is limited which in turn reduces the drying time required and allows dry-to-dry processing in less than 45 seconds. Water pick-up during rapid access processing, measured as the highest increase in element weight at any time during the processing cycle, is contemplated to be limited to less than 120% and preferably less than 115%. It is generally preferred to limit forehardening to permit a weight gain of at least 100% to insure that processing solution has an adequate opportunity to permeate the hydrophilic colloid layers.

The surface protective overcoats are typically provided for physical protection of the emulsion layers. In addition to vehicle features discussed above the overcoats can contain various addenda to modify the physical properties of the overcoats. Such addenda are illustrated by *Research Disclosure,* Item 36544, IX. Coating physical property modifying addenda, A. Coating aids, B. Plasticizers and lubricants, C. Antistats, and D. Matting agents. The interlayers are typically thin hydrophilic colloid layers that provide a separation between the emulsion and the surface overcoat addenda. It is quite common to locate some emulsion compatible types of surface overcoat addenda, such as anti-matte particles, in the interlayers.

Further details about useful portal radiographic films are provided in an number of publications including U.S. Pat. No. 5,871,892 (noted above).

The fluorescent intensifying screens useful in the present invention can take any convenient conventional form. High-resolution fluorescent intensifying screens, such as, for example, those employed in mammography, are unnecessary, since the object is simply to provide images with identifiable anatomical features, not the fine detail required for diagnostics. The fluorescent layers can take any of the forms of those found in intermediate to high speed fluorescent intensifying screens and typically the fluorescent intensifying screens contain a reflective or transparent film support, preferably the former. If a transparent support is employed in the imaging assembly, reflection of light from a back metal intensifying screen can be used to increase the amount of light transmitted to the portal radiographic film. If a reflective (for example, white) support is incorporated in the fluorescent intensifying screen, even a higher proportion of emitted light will reach the portal radiographic film.

Examples of useful fluorescent intensifying screens are provided by *Research Disclosure,* Item 18431, cited above, Section IX. X-Ray Screens/Phosphors, and U.S. Pat. No. 5,021,327 (Bunch et al) and U.S. Pat. No. 4,994,355 (Dickerson et al), U.S. Pat. No. 4,997,750 (Dickerson et al), and U.S. Pat. No. 5,108,881 (Dickerson et al), the disclosures of which are here incorporated by reference. The fluorescent layer contains phosphor particles and a binder, optimally additionally containing a light scattering material, such as titania. Higher emission efficiencies are realized with phosphors such as calcium tungstate ($CaWO_4$) niobium and/or rare earth activated yttrium, lutetium or gadolinium tantalates, and rare earth activated rare earth oxychalcogenides and halides.

The rare earth oxychalcogenide and halide phosphors are preferably chosen from among those of the following formula:

$$M_{(w-n)}M'_nO_wX$$

wherein M is at least one of the metals yttrium, lanthanum, gadolinium or lutetium, M' is at least of the rare earth metals, preferably dysprosium, erbium, europium, holmium, neodymium, praseodymium, samarium, terbium, thulium, or ytterbium, X is a middle chalcogen (S, Se or Te) or halogen, n is 0.002 to 0.2, and w is 1 when X is halogen or 2 when X is chalcogen.

A particularly useful phosphor layer is composed of $Gd_2O_2S:Tb$ in a suitable binder.

The fluorescent intensifying screen can be interposed between the portal radiographic film and a front metal intensifying screen. Alternatively the fluorescent intensifying screen can be interposed between the portal radiographic film and a back metal intensifying screen. When two fluorescent intensifying screens are employed, they can be independently selected, being the same or different in composition and emission efficiencies. The high crossover between the imaging units of the portal radiographic film allows each fluorescent intensifying screen to expose the front and back imaging units.

The filters described above that are used to attenuate or control emission exposure of the radiographic film are prepared similarly to the "wet" chemistry processed radiographic films described above except that they are simpler. They comprise a similar transparent support [such as a poly(ethylene terephthalate) film] and a radiation-sensitive layer such as a fine grain silver halide emulsion layer applied to one side thereof. Generally, they have a density of at least 0.05, and preferably from about 0.1 to about 0.5.

In addition, the filters can be prepared from what are known as "dry silver" or photothermographic materials that are well known from hundreds of publications. Generally, such materials comprise a transparent support having thereon one or more photothermographic emulsion layers.

These materials are imaged using suitable radiation to form a latent image and thermally-developed to provide a visible image. The materials can be imaged and heat-developed to provide neutral densities as described above for the "wet" chemistry processed films. Particularly useful embodiments are commercially available as KODAK DRYVIEW™ Medical and Laser Imaging Films from Eastman Kodak Company. Many details that would enable a skilled worker in the art to construct a useful "dry silver" photothermographic material useful in the practice of this invention are provided for example in U.S. Pat. No. 5,262,295 (Tanaka et al), U.S. Pat. No. 5,952,167 (Okada et al), U.S. Pat. No. 5,981,151 (Leenders et al), U.S. Pat. No. 6,020,117 (Bauer et al), U.S. Pat. No. 6,040,130 (Alton et al), U.S. Pat. No. 6,071,687 (Yamashita), and U.S. Pat. No. 6,083,681 (Lynch et al), all incorporated herein by reference.

When used in preferred embodiments, metal intensifying screens can take any convenient conventional form. While metal intensifying screens can be formed of many different types of materials, the use of metals is most common, since metals are most easily fabricated as thin foils, often mounted on radiation transparent backings to facilitate handling. Convenient metals for screen fabrication are in the atomic number range of from 22 (titanium) to 82 (lead). Metals such as copper, lead, tungsten, iron and tantalum have been most commonly used for metal screen fabrication with lead and copper in that order being the most commonly employed metals.

The metal foils typically range from 0.1 to 2 mm in thickness when employed as a front screen. A preferred front screen thickness range for lead is from about 0.1 to 1 mm and for copper from 0.25 to 2 mm. Generally the higher the atomic number, the higher the density of the metal and the greater its ability to absorb MVp X-radiation.

If used, back metal intensifying screens can be constructed of the same materials as the front intensifying screens. In the case of the back metal intensifying screen, the only advantage to be gained by limiting their thickness is reduction in overall cassette weight. Since a back metal intensifying screen is not essential, there obviously is no minimum essential thickness, but typically the back metal intensifying screen is at least as thick as the front metal intensifying screen with which it is used when both are of the same composition. Generally the thickness of the back metal intensifying screen is determined on the basis of convenience of fabrication and handling and the weight it adds to the cassette assembly.

Instead of employing separate metal and fluorescent intensifying screens, it is possible to integrate both functions into a single element by coating a fluorescent layer onto one or both of the metal intensifying screens. A preferred arrangement of this type is shown below for a commercial imaging assembly:

Metal Intensifying Screen (front)
Portal Radiographic Film
Imaging Unit (front)
Support
Imaging Unit (back)
Integrated Intensifying Screen
Fluorescent Layer
Metal Intensifying Screen (back)

The filters useful in the practice of this invention can be incorporated between thee radiographic film and one or both integrated intensifying screens.

The imaging assemblies described herein can be packaged and/or used in a light-tight imaging article similar to those described for example in U.S. Pat. No. 5,871,892 (noted above, for example in Column 5). A commercial container of this type is available as KODAK ECL System.

The "wet" chemistry processed radiographic films described above for use in the imaging assemblies can be processed to provide an image using conventional black-and-white processing compositions (that is developing and fixing compositions). Representative developing and fixing compositions include KODAK RP Developer and KODAK RP Fixer (both from Eastman Kodak Company). Processing conditions are also well known in the art.

These examples are intended to illustrate the practice of the present invention that is not intended to be limited thereby.

EXAMPLE 1

A suitable set of filters useful in the present invention was prepared in the following manner. A sheet of conventional KODAK HeNe laser film was exposed in a patch-like fashion to nine different densities (0.10, 0.14, 0.17, 0.21, 0.26, 0.30, 0.35, 0.40 and 0.45) using a KODAK 2180 laser printer to form a step tablet. Nine separate full sheets of the same film were exposed to the same densities that were in the step tablet.

Using a conventional radiation therapy treatment machine (Varian 6/12 MVp therapy machine), we exposed a phantom skull using the standard portal conditions of 6 MVp, 2 monitor units to large area, 2 monitor to treatment area, and a 9.8 cm air gap. The imaging assembly comprised the arrangement shown in FIG. 2 using Kodak EC radiographic film, 1 mm copper metal intensifying screen and KODAK EC Regular fluorescent intensifying screens, in a KODAK ECL Cassette. The film was then processed using conventional KODAK RP Developer and RP Fixer described above using commercially known conditions in a KODAK Model M-35 Processor. The resulting image had an optical density of about 2.7 that was too dark.

This process was repeated after placing the step tablet described above between the radiographic film and the back fluorescent intensifying screen e(see FIG. 3). It was observed that the step 3 (0.17 OD) on the step tablet gave, the desired system speed.

We replaced the step tablet with the fall sheet of film having 0.17 OD to act as a filter in the imaging assembly. Imaging was again carried out to provide an image of the desired density.

EXAMPLE 2

The tests described in Example 1 were repeated but the air gap was set to 1.5 cm for imaging with the imaging assemblies. Using the same exposure conditions described in Example 1, the resulting image obtained without a filter was too dark. It was determined that a filter having 0.40 OD was appropriate to provide an image density of about 1.6 which was desired.

EXAMPLE 3

The imaging assembly and procedures described in Example 1 were used again but the imaging air cap was set to 9.8 cm, and exposures were carried out with 2+2 monitors at 4 MVp and 10 MVp, respectively. The 4 MVe exposure was almost the desired density. A filter having 0.10 OD brought the density back to about 1.6. The 10 MVp exposure was much too dark, but a filter of 0.26 OD was used to bring the image to a desired density of about 1.6.

Example 4

The procedure of Example 1 was repeated except that the filters used in the imaging assembly were samples of a "dry silver" photothermographic material commercially available as DRYVIEW™ Laser Imaging Film.

Samples of the photothermographic material were imagewise exposed using a KODAK DRYVIEW™ laser imaging machine, and thermally developed for 15 seconds at 123° C. The samples provided image densities of 0.16, 0.25, 0.38 and 0.46, but any desirable density could be similarly obtained.

In order to evaluate these film samples as filters in the practice of this invention, we established suitable exposure conditions. Because the filters attenuate light from one or both screens, it is apparent that heavily filtered X-rays will give the same effect as megavoltage X-ray exposures. Consequently, we selected 140 kVp filtered with 0.5 mm copper. We also used KODAK EC image recording film and an ECL cassette for these experiments. These components are commonly used for imaging in oncology. We compared the optical density of the image recording film achieved when the HeNe 0.26 density filter from Example 3 was used on the backside to that achieved when the 0.25 density photothermographic filter was used in the same manner.

The optical densities of the image recording films were within 0.03 of each other for all exposures. It is apparent that a thermally-developable "dry silver" material can be used as filter to achieve the desired optical densities in the practice of the present invention.

Example 5

Examples 1–4 were carried out using uniform silver densities to attenuate the light from the screen. Because the light from a fluorescent intensifying screen is composed of a number of lines or is a broad continuous spectrum in the visible region, it is possible to use filters that are of different colors to achieve useful optical densities in the practice of this invention. It is to be noted that a yellow filter will attenuate the blue lines from the LANEX Fast screens in the ECL cassette, a magenta filter will attenuate the green lines, a red filter will attenuate the blue and green lines, and a blue filter will attenuate the red and green lines as shown in the following TABLE.

| Filter | Color | Red density | Green density | Blue density |
| --- | --- | --- | --- | --- |
| Wratten #8 | Yellow | 0.017 | 0.014 | 0.428 |
| Wratten #26 | Red | 0.01 | 3.64 | 4.80 |
| Wratten #32 | Magenta | 0.03 | 2.86 | 0.26 |
| Wratten #47A | Blue | 3.02 | 1.44 | 0.21 |

One can achieve very fine adjustments to the attenuation by using a yellow filter. This is due to the relative lack of light from a LANEX Fast screen pair at 400–450 nm. Alternatively one can use a magenta filter to create a big effect, as it absorbs the dominant green emission lines from LANEX Fast screens. Attenuating the red lines is not useful with Kodak EC film because Kodak EC film is spectrally sensitized to be insensitive to red light, so effectively a red filter is already built in to green sensitive films.

Although this experiment was conducted using LANEX Fast screens and KODAK EC imaging recording film, it is apparent that colored filters could be used with any fluorescent intensifying screens by matching the absorbance of the filter to the emission from the screen.

We repeated the exposures from Example 4, except that we used the 0.17 density HeNe filter from Example 1 as the control filter and the Wratten #8 filter as the experimental filter.

The optical densities of the image recording films were within 0.04 of one another for all exposures. It is apparent that one can use colored filters to selectively attenuate some of the light from the screen(s) to achieve optimally exposed images in the practice of this invention.

The invention has been described in detail with particular reference to certain preferred embodiments thereof, but it will be understood that variations and modifications can be effected within the spirit and scope of the invention.

We claim:

1. An assembly for radiation imaging portal imaging comprising in association:

a) a radiographic film comprising a support and a radiation-sensitive emulsion layer, b) a fluorescent intensifying screen, and c) disposed between said radiographic film and said fluorescent intensifying screen, a filter that has a density of at least 0.05 and attenuates the light emitted from said fluorescent intensifying screen during exposure of said radiographic film, said filter being disposed on the radiation-sensitive layer side of said radiographic film.

2. The assembly of claim 1 further comprising a metal intensifying screen disposed over said fluorescent intensifying screen opposite said radiographic film.

3. The assembly of claim 2 comprising one or more copper or lead intensifying screens.

4. The assembly of claim 1 further comprising a second fluorescent intensifying screen disposed on the support of said radiographic film.

5. The assembly of claim 1 further comprising a second filter between said second intensifying screen and said radiographic film.

6. The assembly of claim 1 wherein said radiographic film comprising a transparent film support.

7. The assembly of claim 6 wherein said radiographic film comprises at least on silver halide emulsion layer on each side of said transparent support.

8. The assembly of claim 7 wherein said radiographic film further comprises a protective overcoat layer over the silver halide emulsion layer(s) on both sides of said transparent support.

9. The assembly of claim 1 wherein said fluorescent intensifying screen comprises a phosphor layer comprising a phosphor and a binder, said phosphor being $Gd_2O_2S:Tb$.

10. The assembly of claim 1 wherein said filter is derived from a light-sensitive silver halide film comprising a transparent support and a silver halide emulsion disposed thereon, said filter having a density from about 0.1 to about 0.5.

11. The assembly of claim 1 wherein said filter is derived from a photothermographic film comprising a support and a photothermographic emulsion layer, said filter having a density of from about 0.1 to about 0.5.

12. A light-tight imaging article comprising a light-tight container containing the assembly of claim 1.

13. A method of portal imaging comprising:

A) positioning a patient between a source of imaging radiation and the light-tight imaging article of claim 12, B) exposing said imaging article to imaging radiation at from 4,000 to 25,000 keV after said radiation passes through said patient.

14. An assembly for radiation imaging portal imaging comprising in association:
   a) a radiographic film comprising a transparent support and a radiation-sensitive emulsion layer on both sides of said transparent support,
   b) a frontside fluorescent intensifying screen on the emulsion side of said radiographic film,
   c) disposed between said radiographic film and said frontside fluorescent intensifying screen, a first filter having a density of at least 0.05 that attenuates the light emitted from said frontside fluorescent intensifying screen during exposure of said radiographic film, said filter being disposed on the radiation-sensitive layer side of said radiographic film,
   d) a backside fluorescent intensifying screen on the support side of said radiographic film, and
   e) disposed between said radiographic film and said backside fluorescent intensifying screen, a second filter that has a density of at least 0.05 and attenuates the light emitted from said backside fluorescent intensifying screen during exposure of said radiographic film, said filter being disposed on the support side of said radiographic film.

15. The assembly of claim 14 further comprising a metal intensifying screen over either said first filter or said second filter, or both.

16. A light-tight imaging article comprising a light-tight container containing the assembly of claim 12.

* * * * *